5571X
Loundsbury, Arnold, McLean, & Bishop,
Washing Machine,
Patented July 15, 1829.
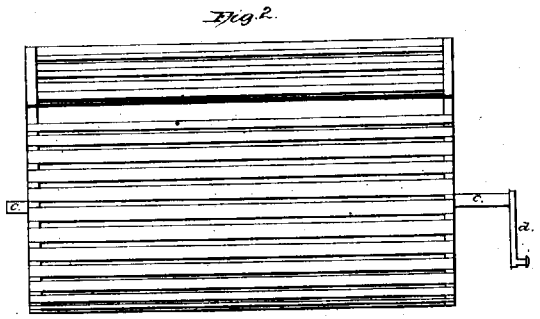
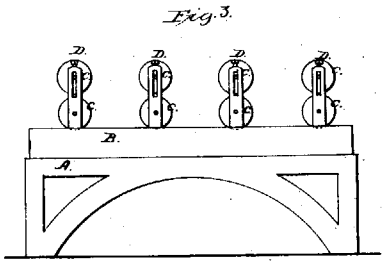
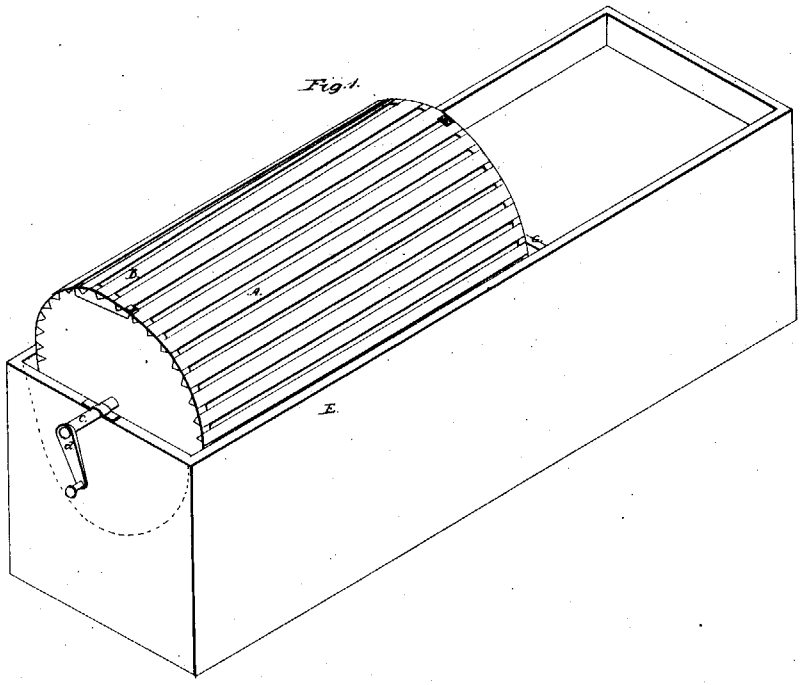
N. PETERS, PHOTO-LITHOGRAPHER, WASHINGTON, D. C.

7/15/1829 5571x

John Arnold & George G. Bishop both of
Norwalk, County of Fairfield & State of Connecticut
Letters Patent No. 11. Dated October 20th 1836.

The Schedule referred to in these Letters Patent
and making part of the same

To all whom it may Concern
Be it known that we
John Arnold & George G. Bishop both of Norwalk
in the County of Fairfield and State of Con-
necticut, both native Citizens of the United
States have invented a new & useful improve-
ment on the Machine heretofore invented
& patented by the said John Arnold "for
forming the bats for cloth of wool, hair or
other suitable substance without spinning or
weaving" patented July 15th 1829.
The imperfections in the Machine
patented as aforesaid [illegible] is the
object of our improvement to remedy
are — 1st. The different [illegible] cylinders
of the patented machine having equal
motion [illegible] accumulate upon
the [illegible] around the cylinders until a
sufficient thickness [illegible] the surface
of each [illegible]
extended and its [illegible] proportionally
increased so that the [illegible] will
no longer cover the whole & the work become
uneven. To remedy this defect as an im-
provement on said machine, we place upon the

7/15/1829 5571X shafts of the doffer & apron Cylinder [illegible]
cones governed by a [illegible] belt in the same
manner & producing the same well known
effect as notched Cones in common use to
regulate the varying & relative motions of
the Cotton Speeder by means of which the
relative motions of the doffer & apron Cylinders
will vary according to the varying extent
of surface around the Carrier & thus make
even & perfect work.

2d [illegible] wool and [illegible] being elastic & the
different kinds of different elasticity it has been
found very difficult if not impossible to work
wool or other material possessing much elasti-
-city on the patented machine on account of its
springing under the Fallers in consequence of
which the Sheets of [illegible] become folded or con-
-tracted and will not retain an even width.
To remedy this defect and as an improve-
-ment on said machine we substitute Combs
in place of the Fallers described in said ma-
-chine which we call Faller Combs.

These Combs are of the same form as
the Chain Combs described in said Patent
and are connected with the same levers which
supported the Faller rods by arms attached
to each. The movement of the Faller Combs
adopted in this improvement is also different
from the movement of the Faller rods in the
patented machine in this. The rods rose
gradually and fell suddenly upon the [illegible].
The Faller combs are at rest whilst the [illegible]

in which the chain Comb and Doffer are ready
to deliver the [illegible] when they [illegible] by force of a
Cam or [illegible] the [illegible] & receiving
the [illegible] from the Chain Comb & Doffer & carry
it down by an easy motion & deliver it on the
[illegible] clearing themselves by [illegible] & spring
in the same manner as the Chain Combs clear
themselves as described in the said patented
machine, being retarded in their downward
movement by a spring or suspended weight
to prevent their sudden descent.

This spring may be a spiral spring
hung from above or a cord from a spring
pole governing the descent more or less gently
as different materials may require.

That these improvements may be more
clearly understood we refer to the drawing
with references to these improvements accom-
-panying this specification as part thereof.

What we claim as our Invention
& Improvement & desire to secure by Letters
Patent is — First — The application of match-
-ed Cones governed by a movable belt to
vary the relative motions or speed of the
Doffer & Apron Cylinders, as the varying
extent of surface around the Carrier is exten-
-ded by the increasing thickness of the lock
as specified above.

Secondly — We claim the substitution
of the Faller Combs with the machinery
to regulate their movement as above
described, instead of the Fallers or faller

7/15/1829 5571X rode, described as part of said patented machine
and these improvements we claim as joint
& several combinations with the other parts
of said patented machine, & therefore pray
Letters Patent.

Norwich Aug 17th 1836

Witnesses: John Arnold
John A. Weed
Samuel G. Blackman

Geo. H. Bishop

Rec'd & Recorded since Novemb. 23-1863.
Hackathorn Patent reported within 12 yrs